(12) United States Patent
Graf

(10) Patent No.: US 6,490,284 B1
(45) Date of Patent: Dec. 3, 2002

(54) USE OF CIC TO IDENTIFY CALLS WHEN USING ISUP IN CONJUNCTION WITH AAL TYPE 2 SIGNALING PROTOCOL

(75) Inventor: Leslie G. Graf, Melbourne (AU)

(73) Assignee: Telefonaktiebolaget LM Ericcson, Stockholm (SE)

(*) Notice: Subject to any disclaimer, the term of this patent is extended or adjusted under 35 U.S.C. 154(b) by 0 days.

(21) Appl. No.: 09/149,175

(22) Filed: Sep. 8, 1998

(51) Int. Cl.[7] .............................................. H04L 12/28
(52) U.S. Cl. .................................. 370/395.2; 370/395.6
(58) Field of Search ........................ 370/395.6–395.65, 370/466–7, 522, 524, 380, 392, 397, 395.2, 395.3

(56) References Cited

U.S. PATENT DOCUMENTS

| | | | | |
|---|---|---|---|---|
| 5,483,527 A | * | 1/1996 | Doshi et al. | 370/60.1 |
| 6,026,089 A | * | 2/2000 | Benayoun et al. | 370/395 |
| 6,041,054 A | * | 3/2000 | Westberg | 370/389 |
| 6,169,735 B1 | * | 1/2001 | Allen et al. | 370/352 |
| 6,314,103 B1 | * | 11/2001 | Medhat et al. | 370/395 |

OTHER PUBLICATIONS

Russell, Signal System #7, 1995, Mcgraw Hill, Second Edition, p. 26–31.*
J.H. Baldwin, et al., "AAL–2—A New ATM Adaption Layer for Small Packet Encapsulation and Multiplexing", Bell Labs Technical Journal, Spring 1997, pp. 111–131.
A. Patel, et al., "The Need for an Advanced ATM Signalling Protocol", Computer Standards & Interfaces 18 (1996), pp. 259–274.

L.Y. Ong, "Modular Evolution of Network Signaling for Broadband", 1995 IEEE, pp. 230–234.
K. D. Gradischnig, "Trends of Signalling Protocol Evolution in ATM Networks", VDE, ISS '95, Apr. 1995, vol. 2, pp. 310–314.

* cited by examiner

Primary Examiner—Chau Nguyen
Assistant Examiner—Ron Abelson

(57) ABSTRACT

In an asynchronous transfer mode (ATM) based transmission network, call control signaling information associated with a first telecommunications signaling protocol, such as an N-ISDN system 7 signaling protocol, is bound to bearer control signaling information associated with a Q.aal2 signaling protocol, where both call control signaling information and bearer control signaling information are required to set-up and maintain an ATM network connection. Binding the call control signaling information and the bearer control signaling information is accomplished as a function of the circuit identification code associated with the call control signaling information, where the circuit identification code is transferred from the N-ISDN system 7 signaling protocol to the Q.aal2 signaling protocol. The call control signaling information and the bearer control signaling information are then independently transported from a source node in the transmission network to a destination node, over an ATM/ATM adaptation layer type 5 transmission link, in accordance with the ISUP system 7 signaling protocol and the Q.aal2 signaling protocol respectively. At the destination node, the call control signaling information and the bearer control signaling information are aligned as a function of the circuit identification code, and an ATM network connection is established.

11 Claims, 3 Drawing Sheets

USE OF CIC TO IDENTIFY CALLS WHEN USING ISUP IN CONJUNCTION WITH AAL TYPE 2 SIGNALING PROTOCOL

FIELD OF THE INVENTION

The present invention relates to signaling protocols in telecommunications networks. More particularly, the present invention relates to a telecommunications network that employs an asynchronous transfer mode (ATM) signaling protocol to transport bearer control signaling messages and a synchronous transfer mode (STM) signaling protocol to transport call control signaling messages.

BACKGROUND

Typically, networking systems employ what is known as a layered architecture. In a layered architecture, data and/or signaling messages are transferred between peer entities at the same level of the layered architecture with the help of the services provided by the underlying layers. The messages exchanged between the peer entities are generated, formatted, transmitted, received and otherwise transported according to the rules described in a protocol specification.

A simple layered architecture may include, among other layers, an application layer, a network layer, a data link layer and a physical layer. The general function of the application layer is to generate, process and format data and/or signaling that is required to support a particular user application (e.g., a cellular voice service). The general function of the network layer is to manage the links and end-to-end relationships between various network entities, for example, the various mobile switching centers, radio network controllers, and base station units in the cellular radio network. The data link layer provides for the transfer of data and signaling between adjacent nodes in the network. The physical layer provides services which are required to interface with the physical environment, such as encoding, modulating, transmitting and receiving signals.

A layered architecture, as described above, may also include a signaling layer. The signaling layer would likely be part of the application or, alternatively, the network layer. The general purpose of a signaling layer is to generate and receive signaling messages, in accordance with a particular signaling protocol. As stated previously, a signaling protocol actually defines the rules which govern the generation and format of signaling messages, which are used, for example, to set-up, maintain and release network connections (e.g., mobile telephone calls) between network entities.

The narrowband integrated services digital network (N-ISDN) user part (ISUP) system 7 is an example of a signaling protocol that is widely employed and well-known in the art. The ISUP system 7 signaling protocol generally supports synchronous transfer mode (STM) based network connections. More specifically, the ISUP system 7 signaling protocol defines a set of rules for transporting call control messages within the network, wherein call control involves functions such as, though not necessarily limited to, billing, call forwarding and caller identification.

As the ISUP system 7 signaling protocol is widely employed throughout the world, there are many national and international variations of the protocol. Accordingly, each variation differs in the specific messages and parameters used for call control. However, regardless of the variation, all include a routing label comprising an originating point code (OPC), a destination point code (DPC), signaling identifier octet (SIO) and a circuit identification code (CIC).

The CIC in particular defines the time slot in a STM data frame that has been allocated to the corresponding call control message. Hence, the CIC implicitly defines the corresponding call.

The AAL2 signaling protocol Q.aal2 is another example of a signaling protocol. Unlike the ISUP system 7 signaling protocol, the Q.aal2 signaling protocol is neither widely employed nor well-known. Further in contrast with the ISUP system 7 signaling protocol, the Q.aal2 signaling protocol defines a set of rules governing the transportation of bearer control messages, wherein bearer control involves the establishment and release of network connections, particularly connections through an AAL2 transmission network.

The Q.aal2 signaling protocol also has associated with it a number of basic codes, for example, a virtual circuit connection identifier (VCCI) code and a channel identification (CID) code. In combination, the VCCI code and the CID code uniquely identify the bearer servicing the AAL2 served user at a given instant in time.

The Q.aal2 signaling protocol is incapable of independently supporting call control signaling messages. Accordingly, when transmitting calls over an AAL2 based transmission network, it would be highly desirable to utilize the call control signaling information available through other signaling protocols, such as the ISUP system 7 signaling protocol, rather than redesign the Q.aal2 signaling protocol so that it is capable of independently supporting call control messages.

SUMMARY OF THE INVENTION

The present invention involves a technique which provides call control signaling support for calls being transported over an AAL2 based transmission network. In general, the present invention accomplishes this by binding the call control signaling information, available through other signaling protocols, such as the ISUP system 7 signaling protocol, with the bearer control signaling information associated with the Q.aal2 signaling protocol, wherein both call control information and bearer control information are required to set-up, maintain, and release calls. Moreover, the present invention links the call control signaling information and the bearer control signaling information without any need to redevelop the Q.aal2 signaling protocol or the ISUP system 7 signaling protocol.

Accordingly, it is an objective of the present invention to provide call control signaling information for calls being transported over an AAL2 based transmission network connection.

It is another objective of the present invention to provide call control signaling information for calls being transported over an AAL2 based transmission network connection, supported by a Q.aal2 signaling protocol, without the need to modify or otherwise redesign the Q.aal2 signaling protocol.

In accordance with one aspect of the present invention these and other objectives are achieved by a method for setting up and maintaining an asynchronous transfer mode (ATM) connection. The method involves detecting an identification code associated with call control signaling information, wherein the call control signaling information is formatted in accordance with a first telecommunications signaling protocol. The identification code is then transferred to a second telecommunications signaling protocol, wherein the second telecommunications signaling protocol is an ATM adaptation layer type 2 (AAL2) signaling protocol, and wherein the AAL2 signaling protocol is associated with the formatting of AAL2 bearer control signaling information. Once the identification code is transferred, the call control signaling information and the identification code are transported from a source node in the telecommunications network to a destination node in the telecommunications network in accordance with the first telecommunications signaling protocol, and the AAL2 bearer control signaling information and the identification code are transported from the source node to the destination node in accordance with the second telecommunications signaling protocol. At the destination node, the call control signaling information and the AAL2 bearer control signaling information are bound together as a function of the identification code, and the ATM connection is set-up as a function of the call control signaling information and the AAL2 bearer control signaling information.

In accordance with one aspect of the present invention these and other objectives are achieved by a method for binding call control signaling information and ATM adaptation layer type 2 (AAL2) bearer control signaling information, wherein the call control signaling information and the AAL2 bearer control signaling information are required to set-up and maintain a corresponding ATM voice connection. The method involves defining a system 7 user part at a source node in the ATM based telecommunications network as an AAL2 served user, wherein the system 7 user part is supported by an integrated services digital network user part (ISUP) system 7 signaling protocol which is employed for formatting the call control signaling information. Next, the ISUP system 7 signaling protocol invokes a Q.aal2 signaling protocol, wherein the Q.aal2 signaling protocol is responsible for formatting the AAL2 bearer control signaling information. A circuit identifier code (CIC) from the system 7 user part is then transferred to the Q.aal2 signaling protocol, wherein the CIC uniquely identifies the call control signaling information. Next, the call control signaling information and the CIC are transported from the system 7 user part in the source node to a peer system 7 user part at a destination node in accordance with the ISUP system 7 signaling protocol, and the AAL2 bearer control signaling information, the CIC, and a connection identifier (CID) code are transported from the source node to the destination node in accordance with the Q.aal2 signaling protocol, wherein the CID code identifies the ATM voice connection. At the destination node, the CIC is transferred from the Q.aal2 signaling protocol to the system 7 user part, and the system 7 user part is informed that an AAL2 transmission connection has been established. Finally, the call control signaling information and the AAL2 bearer control signaling information are aligned, thereby establishing the ATM voice connection as a function of the CIC and the CID.

DETAILED DESCRIPTION OF THE INVENTION

The present invention involves a technique whereby call control signaling information associated with one telecommunication signaling protocol (e.g., an ISUP system 7 signaling protocol) is bound to bearer control signaling information associated with a second telecommunications signaling protocol (e.g., Q.aal2), wherein the second signaling protocol is incapable of independently supporting call control signaling messages. The objectives, features and advantages of the present invention will become readily apparent from the following written description read in conjunction with the figures.

Figure 1:
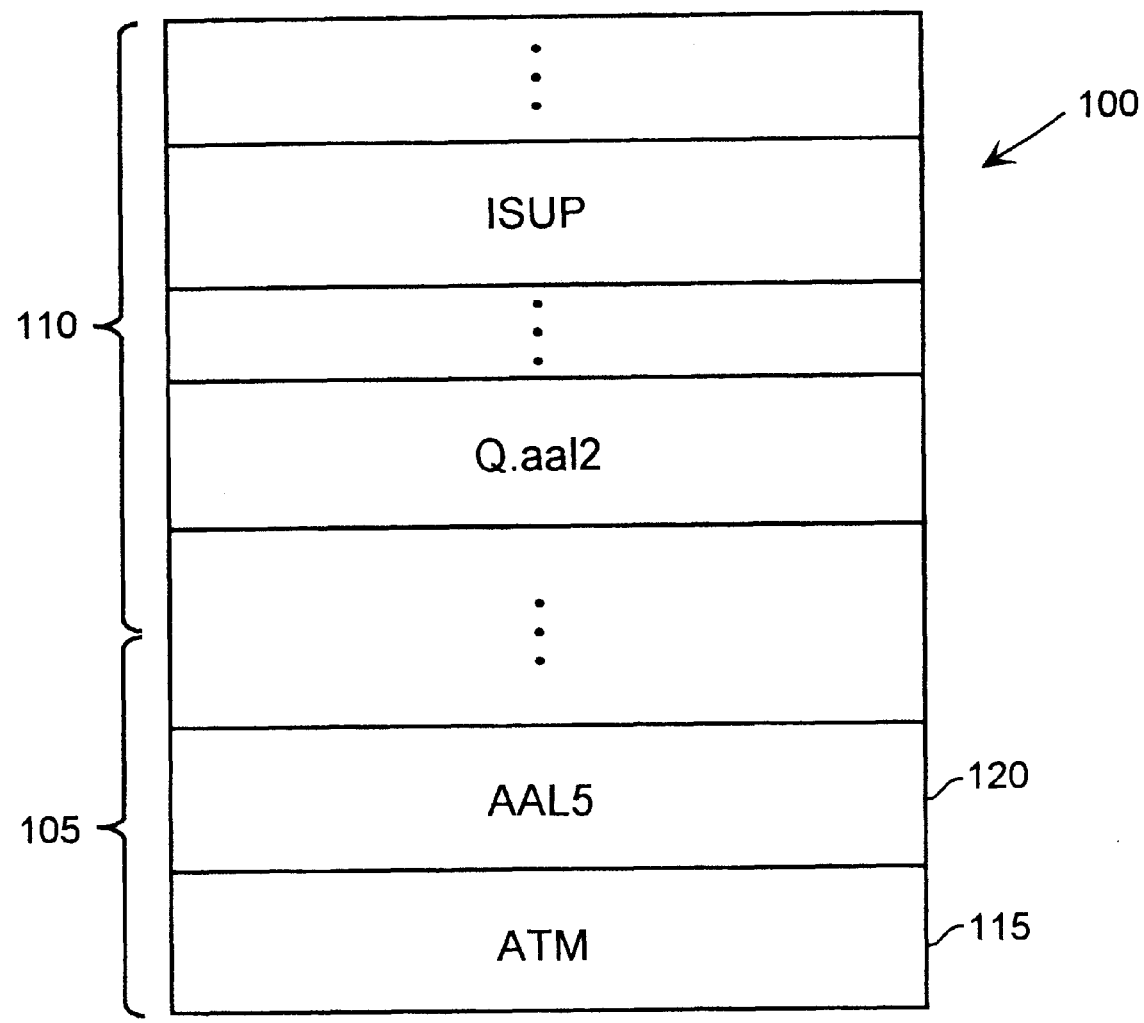
FIG. 1 illustrates an exemplary layered architecture for a telecommunications network which employs, in conjunction, both a N-ISUP system 7 signaling protocol and a Q.aal2 signaling protocol in accordance with an exemplary embodiment of the present invention.

FIG. 1 illustrates a portion of an exemplary layered architecture 100 for an asynchronous transfer mode (ATM) based telecommunications network. The layered architecture 100 is shown as including a physical layer 105 and a signaling layer 110. However, it will be understood that the layered architecture 100 will include other functional layers (not shown), such as a network layer, a data link layer and/or an application layer.

The physical layer 105, in turn, is shown to include an ATM layer 115 and an ATM adaptation layer type 5 (AAL5) 120. The ATM layer 115, as is well known in the art, controls the transportation of ATM data packets (i.e., ATM cells), which contain telecommunications data (e.g., voice data), from a source node to a destination node in the ATM based network. The telecommunications data may or may not be further contained in additional data packets or minicells (e.g., AAL2 data packets), which are multiplexed into the payload portion of the ATM cells. In general, the AAL5 120 supports the ATM layer 115 with such functions as data segmentation at the source node, data reassembly at the destination node, and error detection. The protocols governing the ATM layer 115 and the AAL5 120 are also well known in the art.

The signaling layer 110 is shown to include two signaling sublayers. The first signaling sublayer is a narrowband integrated services digital network (N-ISDN) user part (ISUP) system 7 signaling sublayer. The second signaling sublayer is a Q.aal2 signaling sublayer. The ISUP system 7 signaling sublayer is employed for transporting call control signaling messages through the network over a synchronous transfer mode (STM) link. For the purpose of the present invention, call control information may include, but is not limited to, billing information and information needed to support such intelligent network services as call forwarding, caller identification and the like. As the ISUP system 7 signaling protocol is associated with STM, it is unrelated to and not conventionally used in conjunction with ATM.

In contrast with the ISUP system 7 signaling protocol, the Q.aal2 signaling protocol supports the formatting of and transport of bearer control signaling messages for an ATM based network connection. The Q.aal2 signaling protocol is incapable of independently supporting the formatting of and transportation of call control signaling messages.

Figure 2:
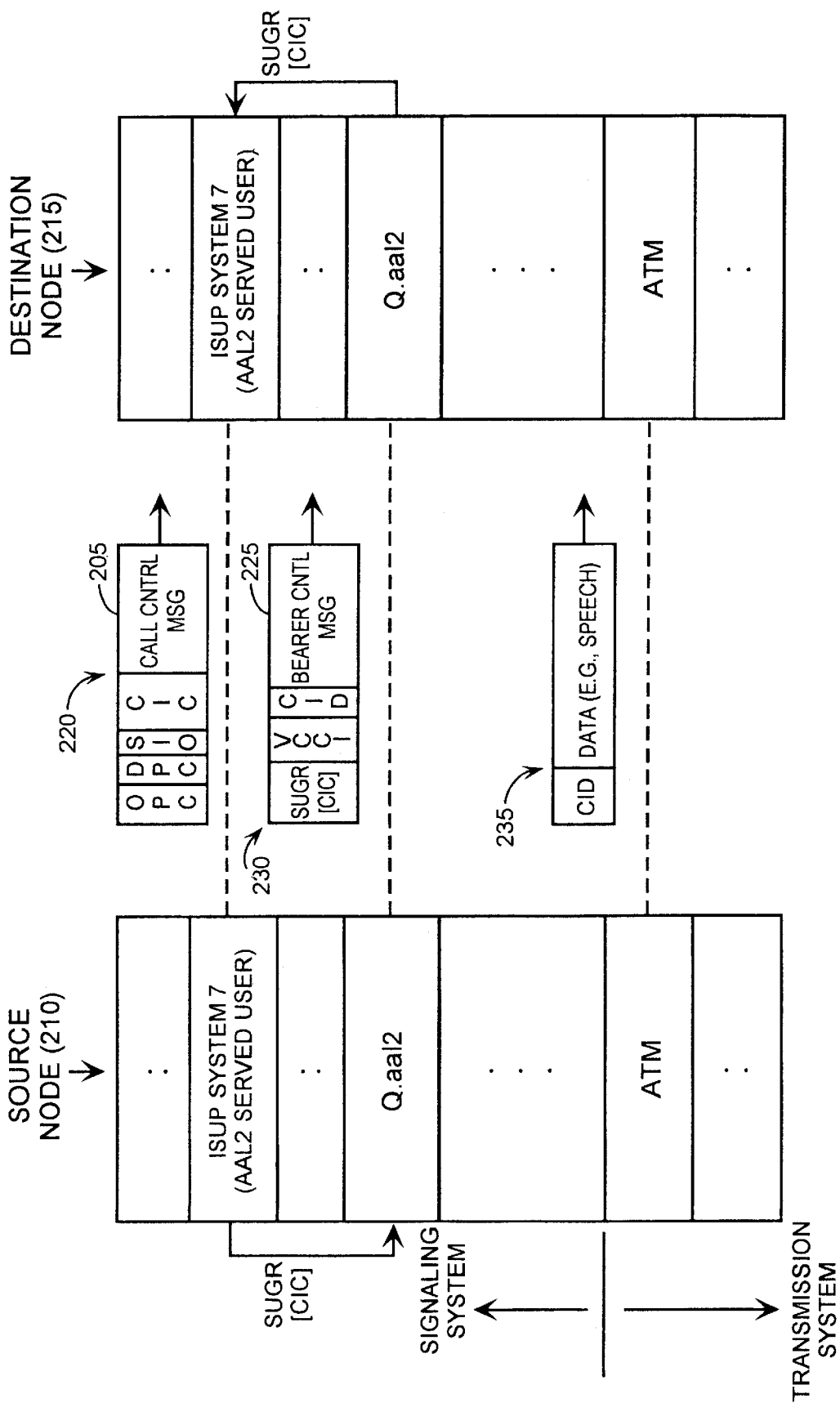
FIG. 2 is a diagram representing the technique of binding the call control signaling information with the bearer control signaling information in accordance with an exemplary embodiment of the present invention.

FIG. 2 depicts a technique for binding the call control signaling information, associated with the ISUP system 7 signaling protocol, and the bearer control signaling information, associated with the Q.aal2 signaling protocol, in accordance with an exemplary embodiment of the present invention. More specifically, the technique illustrated in FIG. 2 involves transporting call control signaling information from a system 7 user part in a source node 210 to a system 7 user part in a destination node 215. During the transportation of the call control signaling information from the system 7 user part in the source node 210 to the system 7 user part in a destination node 215, the call control signaling information is contained in a call control signaling message 205, which, in turn, is contained in a payload portion of a system 7 message transfer part (MTP) 220. In addition, the technique illustrated in FIG. 2 involves transporting bearer control signaling information from an AAL2 served user in the source node 210 to an AAL2 served user in the destination node 215. During the transportation of the bearer control signaling information from the AAL2 served user in the source node 210 to the AAL2 served user in the destination node 215, the bearer control signaling information is contained in a bearer control signaling message 225, which is contained in a payload portion of a system 7 MTU 230. Moreover, data associated with a corresponding call is transported from the source node 210 to the destination node 215 in the payload portion of an ATM cell, for example, ATM cell 235.

In order to bind the call control signaling information contained in the call control message 205, the technique illustrated in FIG. 2 copies the CIC associated with the call control signaling information into the AAL2 served user generated register (SUGR) at the source node 210. The SUGR containing the CIC is then made available to the Q.aal2 signaling protocol, which inserts the SUGR into the Q.aal2 signaling packet 230. The SUGR field in the Q.aal2 signaling packet 230 is transparent to any intermediate AAL2 network nodes. Accordingly, the CIC contained in the SUGR is transported to the destination node 215.

At the destination node 215, the CIC is used to associated (i.e., bind) the call control signaling information with the bearer control signaling information. As the Q.aal2 signaling packet 230 also contains a VCCI and CID code, the call control signaling information and the bearer control signaling information are further bound to the telecommunications data associated with a corresponding call, for example, the voice/speech data contained in the payload of ATM cell 235.

As previously stated, the destination node 215 requires both the call control signaling information and the bearer control signaling information to establish and maintain the corresponding AAL2 connection (i.e., the corresponding call). In accordance with the technique described above; however, the Q.aal2 signaling protocol and the ISUP system 7 signaling protocol can be used in conjunction with one another to convey the necessary signaling information.

Figure 3:
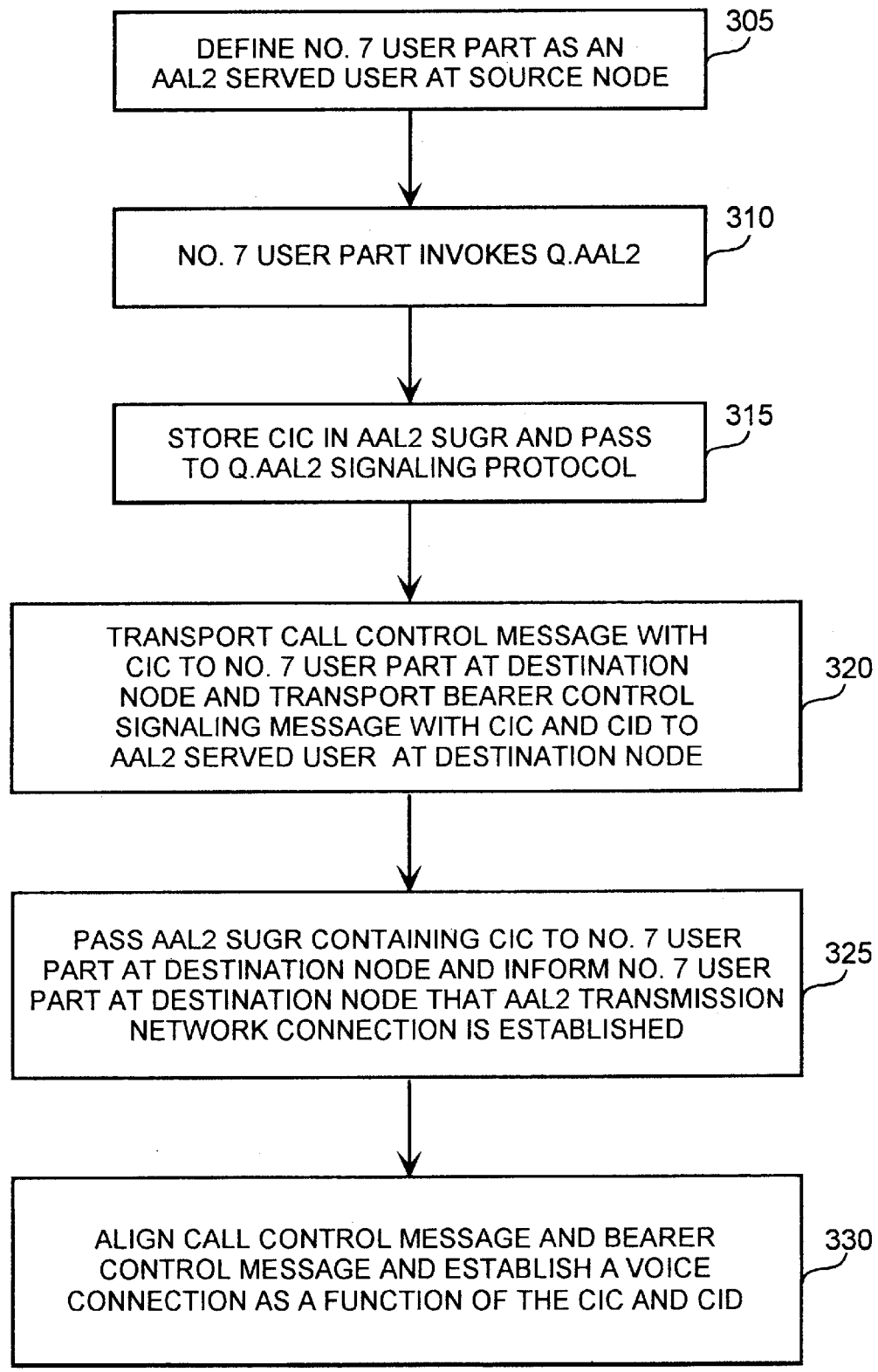
FIG. 3 is a flowchart depicting a method associated with an exemplary embodiment of the present invention.

FIG. 3 is a flowchart that more specifically depicts the method steps associated with the technique described above. In accordance with step 305 in FIG. 3, the ISUP system 7 signaling protocol is defined as an AAL2 served user at the source node 210. The ISUP system 7 signaling protocol then invokes the Q.aal2 signaling protocol as indicated in step 310. By invoking the Q.aal2 signaling protocol, the ISUP system 7 signaling protocol requests an AAL2 transmission network connection. Next, the ISUP system 7 signaling protocol stores the CIC associated with the call control signaling information in an AAL2 SUGR, which is then passed from the ISUP system 7 signaling protocol to the Q.aal2 signaling protocol in a conventional manner, as represented by step 315. The Q.aal2 signaling protocol then inserts the SUGR containing the CIC into the Q. signaling message that contains the corresponding bearer control signaling information. In accordance with step 320, the call control message is then transported from the ISUP system 7 user at the source node 210 to the ISUP system 7 user at the destination node 215 in a STM data frame time slot defined by the CIC. Also in accordance with step 320, the bearer control message, along with the CIC stored in the SUGR, is transported from AAL2 served user at the source node 210 to the AAL2 served user at the destination node 215. At the destination node 215, the AAL2 SUGR containing the CIC is passed from the Q.aal2 signaling protocol to the ISUP system 7 signaling protocol, as illustrated in step 325. The ISUP system 7 user at the destination node 215 is thereafter informed that an AAL2 transmission network connection has been established as a function of the call control signaling information and the bearer control signaling information transported to the destination node 215 over an ATM/AAL5 signaling link. The call control signaling message and the bearer control signaling message are then aligned and an ATM connection (e.g., a voice/speech connection) is established as a function of the CIC and the CID code.

The present invention has been described with reference to an exemplary embodiment. However, it will be readily apparent to those skilled in the art that it is possible to embody the invention in specific forms other than the exemplary embodiment described above, and that this may be done without departing from the spirit of the invention. For example, call control signaling information may be made available through signaling protocols other than the ISUP system 7 signaling protocol, which is generally associated with the interface between a public and a private telecommunications network. More specifically, call control signaling information might be obtained in a substantially similar manner from the Q.931 signaling protocol, wherein the Q.931 signaling protocol is the ITU-T recommendation designation for the basic call part of the Digital Signaling system No. 1 (DSS1) signaling protocol, and wherein the Q.931 signaling protocol is associated with the interface between wired terminals and a public network. Call control signaling information might also be obtained through the Q.SIG signaling protocol, which is an ISO standard for private networks. Accordingly, the exemplary embodiment described above is to be viewed as illustrative and it should not be considered restrictive in any way. The scope of the invention is given by the appended claims, rather than the preceding description, and all variations and equivalents which fall within the range of the claims are intended to be embraced therein.

What is claimed is:

1. In a telecommunications network, a method for setting up and maintaining an asynchronous transfer mode (ATM) connection comprising the steps of:

detecting an identification code associated with call control signaling information, wherein the call control signaling information is formatted in accordance with a first telecommunications signaling protocol;

transferring the identification code to a second telecommunications signaling protocol, wherein the second telecommunications signaling protocol is an ATM adaptation layer type 2 (AAL2) signaling protocol, and wherein the AAL2 signaling protocol is associated with the formatting of AAL2 bearer control signaling information;

transporting the call control signaling information and the identification code from a source node in the telecommunications network to a destination node in the telecommunications network in accordance with the first telecommunications signaling protocol;

transporting the AAL2 bearer control signaling information and the identification code from the source node to the destination node in accordance with the second telecommunications signaling protocol;

at the destination node, binding the call control signaling information to the AAL2 bearer control signaling information as a function of the identification code; and setting up the ATM connection as a function of the call control signaling information and the AAL2 bearer control signaling information.

2. The method of claim 1, wherein the first telecommunications signaling protocol is a narrowband integrated services digital network user part (N-ISUP) system 7 signaling protocol.

3. The method of claim 2, wherein the identification code is a circuit identification code.

4. The method of claim 1, wherein the first telecommunications signaling protocol is a Q.931 signaling protocol.

5. The method of claim 1, wherein the first telecommunications signaling protocol is a Q.SIG signaling protocol.

6. In an Asynchronous Transfer Mode (ATM) based telecommunications network, a method for binding call control signaling information and ATM adaptation layer type 2 (AAL2) bearer control signaling information, wherein said call control signaling information and said AAL2 bearer control signaling information are required to set-up and maintain a corresponding ATM voice connection, said method comprising the steps of:

defining a system 7 user part at a source node in the ATM based telecommunications network as an AAL2 served user, wherein the system 7 user part is supported by an integrated services digital network user part (ISUP) system 7 signaling protocol which is employed for formatting the call control signaling information;

invoking a Q.aal2 signaling protocol, wherein the Q.aal2 signaling protocol is responsible for formatting the AAL2 bearer control signaling information;

transferring a circuit identifier code (CIC) from the system 7 user part to the Q.aal2 signaling protocol, wherein the CIC uniquely identifies the call control signaling information;

transporting the call control signaling information and the CIC from the system 7 user part in the source node to a peer system 7 user part at a destination node in accordance with the ISUP system 7 signaling protocol;

transporting the AAL2 bearer control signaling information, the CIC, and a connection identifier (CID) code from the source node to the destination node in accordance with the Q.aal2 signaling protocol, wherein the CID code identifies the ATM voice connection;

at the destination node, transferring the CIC from the Q.aal2 signaling protocol to the system 7 user part, and informing the system 7 user part that an AAL2 transmission connection has been established; and aligning the call control signaling information and the AAL2 bearer control signaling information to establish the ATM voice connection as a function of the CIC and the CID.

7. The method of claim 6, wherein said step of invoking the Q.aal2 signaling protocol comprises the step of:

requesting an AAL2 transmission connection.

8. The method of claim 6, wherein the call control signaling information and the AAL2 bearer control signaling information are independently transported from the source node to the destination node over an ATM/ATM adaptation layer type 5 (ATM/AAL5) network transmission link.

9. The method of claim 6, wherein said step of CIC from the system 7 user part to the Q.aal2 signaling protocol comprises the steps of:

storing the CIC in an AAL2 served user generated register; and passing the AAL2 served user generated register to the Q.aal2 signaling protocol.

10. The method of claim 9, wherein said step of transferring the CIC from the Q.aal2 signaling protocol to the system 7 user part at the destination node comprises the step of:

passing the AAL2 served user generated register from the Q.aal2 signaling protocol to the system 7 user part.

11. The method of claim 10, wherein the AAL2 served user generated register containing the CIC is transported from the source node to the destination node along with the AAL2 bearer control signaling information in such as manner that the CIC is transparent to any intermediate network nodes through which the AAL2 bearer control signaling information might be routed.

* * * * *